(12) United States Patent
Gruhlke et al.

(10) Patent No.: US 11,275,467 B1
(45) Date of Patent: Mar. 15, 2022

(54) INTEGRATING OPTICAL FINGERPRINTING INTO A FRONT-FACING SMARTPHONE CAMERA

(71) Applicant: QUALCOMM Incorporated, San Diego, CA (US)

(72) Inventors: Russell Wayne Gruhlke, San Jose, CA (US); Naga Chandan Babu Gudivada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/301,708

(22) Filed: Apr. 12, 2021

(51) Int. Cl.
*G06K 9/00* (2006.01)
*G06F 3/041* (2006.01)

(52) U.S. Cl.
CPC ....... *G06F 3/0416* (2013.01); *G06K 9/00013* (2013.01)

(58) Field of Classification Search
CPC ........ G06K 9/00006–0012; G06K 2009/0006; G06F 3/041–047
See application file for complete search history.

(56) References Cited

U.S. PATENT DOCUMENTS

| | | | | |
|---|---|---|---|---|
| 10,719,687 B2 * | 7/2020 | Wu | ...................... | G06K 9/0004 |
| 10,810,294 B2 * | 10/2020 | Yim | ...................... | H04L 9/3231 |
| 11,010,586 B2 * | 5/2021 | Yang | ...................... | G06K 9/0004 |
| 2015/0310251 A1 * | 10/2015 | Wyrwas | ............. | G06K 9/00046 348/77 |
| 2020/0034598 A1 * | 1/2020 | Wu | ...................... | G06K 9/0004 |
| 2021/0248344 A1 * | 8/2021 | Wu | ...................... | G02F 1/13338 |

\* cited by examiner

*Primary Examiner* — Patrick F Marinelli
(74) *Attorney, Agent, or Firm* — Qualcomm Incorporated

(57) ABSTRACT

In some implementations, a control system may receive touch sensor signals from a touch sensor system indicating a camera area touch, the camera area touch corresponding to a target object touching a transparent cover in a camera area. The control system may control, responsive to the camera area touch, a light source system to provide light to the target object. The control system may receive, from the camera, image data corresponding to light reflected and/or scattered from the target object. The control system may perform a fingerprint authentication process based, at least in part, on the image data.

26 Claims, 6 Drawing Sheets

INTEGRATING OPTICAL FINGERPRINTING INTO A FRONT-FACING SMARTPHONE CAMERA

TECHNICAL FIELD

This disclosure relates generally to optical sensor devices and related methods.

DESCRIPTION OF THE RELATED TECHNOLOGY

Fingerprint sensor systems are commonly featured in a variety of devices. Biometric authentication, including but not limited to fingerprint-based authentication, can be an important feature for controlling access to devices, secured areas, etc. Although some existing fingerprint sensor systems provide satisfactory performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. According to some examples, the apparatus may include a touch sensor system, a transparent cover, a camera proximate a camera area of the transparent cover, a light source system and a control system. According to some examples, the apparatus may include a control system configured for communication with (e.g. electrically or wirelessly coupled to) the touch sensor system, the light source system and the camera. In some examples, the control system may include a memory, whereas in other examples the control system may be configured for communication with a memory that is not part of the control system. According to some examples, the apparatus may be integrated into a mobile device. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to receive touch sensor signals from the touch sensor system indicating a camera area touch. The camera area touch may, for example, correspond to a target object touching the transparent cover in the camera area. In some examples, the control system may be configured to control, responsive to the camera area touch, the light source system to provide light to the target object. According to some implementations, the control system may be configured to receive, from the camera, image data corresponding to light reflected or scattered from the target object. In some examples, the control system may be configured to perform a fingerprint authentication process based, at least in part, on the image data. In some examples, the control system may be configured to cause the camera to focus on at least a portion of the target object.

According to some implementations, the light source system may include at least one light source proximate the camera and configured to illuminate the target object when the target object is touching the camera area. In some examples, the at least one light source proximate the camera may be, or may include, a light-emitting diode.

According to some examples, the light source system may be configured to couple light into the transparent cover. For example, in some instances the light source system may include a light-turning film configured to couple the light into the transparent cover. In some examples, the light-turning film may reside between the transparent cover and at least one light source of the light source system. In some implementations, at least one light source of the light source system may reside on a first side of the transparent cover. In some such examples, the light-turning film may reside on a second and opposing side of the transparent cover. In some implementations, the light-turning film may include one or more of a holographic volume grating, a surface relief grating or reflective facets. Alternatively, or additionally, in some examples the light source system may be configured to couple light into the transparent cover via edge coupling.

In some implementations, the light source system may include one or more display pixels configured to provide light to the light-turning film. According to some examples, the one or more display pixels may include one or more light-emitting diode pixels, one or more organic light-emitting diode pixels or one or more liquid crystal display pixels.

According to some examples, the control system may be configured to extract fingerprint features from the image data. In some such examples, the fingerprint authentication process may involve comparing currently-obtained fingerprint features with fingerprint features obtained during an enrollment process. The fingerprint features may, for example, include fingerprint minutiae, keypoints and/or sweat pores.

Other innovative aspects of the subject matter described in this disclosure may be implemented in a method. In some examples, the method may involve receiving, by a control system, touch sensor signals from a touch sensor system indicating a camera area touch. The camera area touch may, for example, correspond to a target object touching a transparent cover in a camera area. According some examples, the method may involve controlling, by the control system and responsive to the camera area touch, a light source system to provide light to the target object. In some examples, the method may involve receiving, from the camera and by the control system, image data corresponding to light reflected or scattered from the target object. According some examples, the method may involve performing, by the control system, a fingerprint authentication process based, at least in part, on the image data. In some examples, the method may involve causing, by the control system, the camera to focus on at least a portion of the target object.

In some examples, the method may involve coupling light into the transparent cover via edge coupling. Alternatively, or additionally, in some examples the method may involve coupling light into the transparent cover via a light-turning film.

According some examples, the method may involve extracting, by the control system, fingerprint features from the image data. In some such examples, the fingerprint authentication process may involve comparing currently-obtained fingerprint features with fingerprint features obtained during an enrollment process. In some instances, the fingerprint features may include fingerprint minutiae, keypoints and/or sweat pores.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method.

In some examples, the method may involve receiving, by a control system, touch sensor signals from a touch sensor system indicating a camera area touch, the camera area touch corresponding to a target object touching a transparent cover in a camera area. According some examples, the method may involve controlling, by the control system and responsive to the camera area touch, a light source system to provide light to the target object. In some examples, the method may involve receiving, from the camera and by the control system, image data corresponding to light reflected or scattered from the target object. According some examples, the method may involve performing, by the control system, a fingerprint authentication process based, at least in part, on the image data. In some examples, the method may involve causing, by the control system, the camera to focus on at least a portion of the target object.

In some examples, the method may involve coupling light into the transparent cover via edge coupling. Alternatively, or additionally, in some examples the method may involve coupling light into the transparent cover via a light-turning film.

According some examples, the method may involve extracting, by the control system, fingerprint features from the image data. In some such examples, the fingerprint authentication process may involve comparing currently-obtained fingerprint features with fingerprint features obtained during an enrollment process. In some instances, the fingerprint features may include fingerprint minutiae, keypoints and/or sweat pores.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
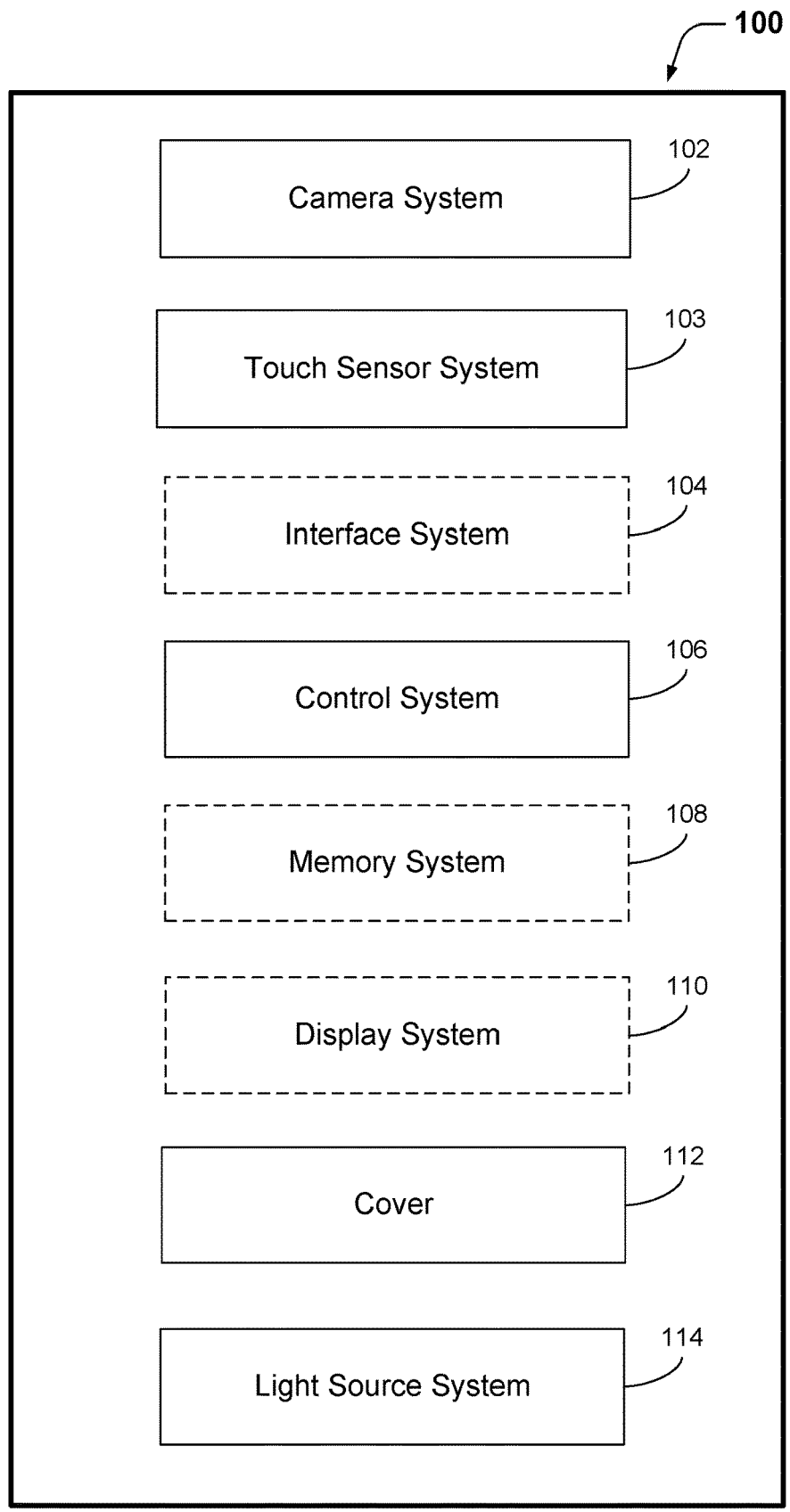
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The use of fingerprint sensors for authentication is now commonplace. (As used herein, the term "finger" may refer to any digit, including a thumb. Accordingly, a thumbprint will be considered a type of "fingerprint.") In some examples, a control system of an apparatus may be configured to obtain a target object location (e.g., a digit location) for fingerprint sensor scanning via input from a touch sensor system.

An increasing number of mobile devices, such as cell phones, feature an in-display fingerprint reader based on one or more optical sensors. Some such examples include an optical scanner that causes light to illuminate a finger. In some such implementations, a small camera under the screen takes an image of the finger, which is then compared to a stored image during an authentication process. The in-display camera used for fingerprint authentication is normally deployed in addition to a front-facing "selfie" camera.

In some disclosed implementations, a control system may receive touch sensor signals from a touch sensor system indicating a touch of a target object on a transparent cover in a selfie camera area. Responsive to the camera area touch, the control system may be configured to cause a light source system to provide light to the target object. In some examples, the light source system may include a light source for optical fingerprint authentication that is part of a display system. However, in other examples the light source for optical fingerprint authentication may be separate from and/or in addition to light sources of the display system. In some instances, the light source system may be configured to couple light into the transparent cover. The control system may be configured to receive image data from the camera corresponding to light reflected from or scattered from the target object. The control system may be configured to perform a fingerprint authentication process based, at least in part, on the image data.

Particular implementations of the subject matter described in this disclosure may be implemented to realize one or more of the following potential advantages. Some disclosed devices provide optical fingerprint authentication using a front-facing "selfie" camera, without the need for an additional in-display camera. These implementations can provide cost savings relative to previously-deployed under-display optical fingerprint sensors. In some implementations, a light source for an optical fingerprint sensor may also be a light source of a display system.

FIG. 1 is a block diagram that shows example components of an apparatus according to some disclosed implementations. In this example, the apparatus 100 includes a camera system 102, a touch sensor system 103, a control system 106, a cover 112 and a light source system 114. Some implementations may include an interface system 104, a memory system 108, and/or a display system 110.

According to some examples, the camera system 102 may include one or more front-facing or "selfie" cameras. As used herein, the term "front-facing camera" refers to a camera that resides on the same side of a device, such as a cell phone, that includes the main display (or one of the main displays) of the device. A front-facing camera is configured to receive light from the same side of the device that includes a main display. In some examples, the camera system 102 may include one or more arrays of active pixel sensors, such as complementary metal-oxide-semiconductor (CMOS) sensors. According to some implementations, the camera system 102 may include one or more arrays of charge-coupled device (CCD) image sensors.

The touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

Some implementations of the apparatus 100 may include an interface system 104. In some examples, the interface system 104 may include a wireless interface system. In some implementations, the interface system 104 may include a user interface system, one or more network interfaces, one or more interfaces between the control system 106 and the camera system 102, one or more interfaces between the control system 106 and the touch sensor system 103, one or more interfaces between the control system 106 and the memory system 108, one or more interfaces between the control system 106 and the display system 110, and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 100. In some such examples, the interface system 104 may be configured to provide communication between the control system 106 and the camera system 102. According to some such examples, the interface system 104 may couple at least a portion of the control system 106 to the camera system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 100 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the camera system 102, the touch sensor system 103 and the display system 110. According to some examples, the control system 106 may include a dedicated component for controlling the camera system 102, a dedicated component for controlling the touch sensor system 103 and/or a dedicated component for controlling the display system 110. If the apparatus includes a memory system 108 that is separate from the control system 106, the control system 106 also may be configured for communication with the memory system 108. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some implementations, the apparatus 100 includes a display system 110. In some such examples, the display system 110 may be, or may include, a light-emitting diode (LED) display, such as an organic light-emitting diode (OLED) display. In some examples, the display system 110 may include liquid crystal display (LCD) pixels.

According to this example, the apparatus 100 includes a cover 112. In some implementations, the cover 112 includes one or more transparent portions. For example, the cover 112 may include a "cover glass" proximate (e.g., extending over) the display system 110 and proximate one or more front-facing cameras of the camera system 102. A cover glass generally includes transparent material, which may be a type of glass, hard plastic, etc.

In this example, the apparatus 100 includes a light source system 114. In some instances, a transparent portion of the cover may be part of the light source system 114. In some such examples, the light source system 114 may be configured to couple light into a transparent portion of the cover 112. In some examples, a transparent portion of the cover 112 may function as an optical light guide. According to some examples, the light source system 114 may include a light-turning film. According to some such implementations, the light source system 114 may include a holographic volume grating, a surface relief grating, reflective facets and/or a diffuser patch. In some examples, the light source system 114 may include a light source for an optical fingerprint sensor that is also part of the display system 110. However, in other examples the light source for the optical fingerprint sensor may be separate from and/or in addition to light sources of the display system 110. Various examples of the light source system 114 are shown in FIGS. 2-5C and are described below.

The apparatus 100 may be used in a variety of different contexts, some examples of which are disclosed herein. For example, in some implementations a mobile device may include at least a portion of the apparatus 100. In some implementations, a wearable device may include at least a portion of the apparatus 100. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
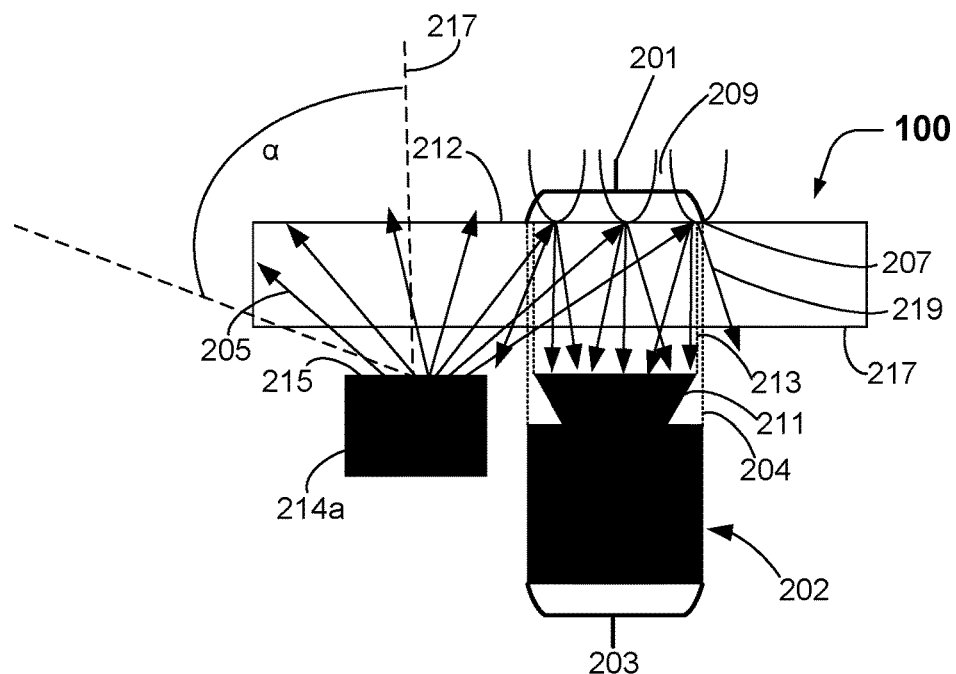
FIG. 2 shows a cross-section though one example of the apparatus of FIG. 1.

FIG. 2 shows a cross-section though one example of the apparatus of FIG. 1. As with other disclosed implementations, the types, numbers and arrangements of elements that are shown in FIG. 2, as well as the dimensions of elements, are merely examples. In this example, the apparatus 100 includes a transparent cover portion 212 of the cover 112, a camera 202 of the camera system 102 proximate a camera area 201 of the transparent cover portion 212 and a light source 214a of the light source system 114. According to this example, the camera area 201 of the transparent cover portion 212 corresponds with the area of the camera body portion 203, as indicated by the lines 204. In other examples, the camera area 201 of the transparent cover portion 212 corresponds with the area of the camera lens portion 211, as indicated by the lines 213. In other examples, the camera area 201 of the transparent cover portion 212 corresponds with an area that is within a range of the area of the camera body portion 203 or the area of the camera lens portion 211, e.g., within 5%, within 10%, within 15%, within 20%, within 25%, etc.

Although not shown in FIG. 2, according to this example the apparatus 100 includes a touch sensor system and a control system, which are instances of the touch sensor system 103 and the control system 106 that are described above with reference to FIG. 1. In this example, the control system has received touch sensor signals from the touch sensor system indicating a camera area touch. According to this example, the camera area touch corresponds to a target object touching the transparent cover portion 212 in the camera area 201. In this instance, the target object is a finger, some ridges 207 and valleys 209 of which are shown in FIG. 2. In this example, the control system is configured to control, responsive to the camera area touch, the light source system 114 to provide light to the target object. According to some examples, the camera may be configured to focus on at least a portion of the target object. In some examples, the control system may be configured to cause the camera to focus on at least a portion of the target object, e.g., responsive to receiving touch sensor signals indicating a camera area touch.

According to this example, the light source system 114 includes at least the light source 214a (and in some examples one or more other light sources) proximate the camera 202. In this implementation, at least the light source 214a is configured to illuminate the target object with light 205 in response to the target object touching the camera area 201. In some examples, the light source 214a may be one of two or more light sources that are proximate the camera 202 and configured to illuminate the target object with light 205 when the target object is touching the camera area 201. One such example is described below with reference to FIG. 5D. In some implementations, the light source 214a may be, or may include, a light-emitting diode (LED). According to some such implementations, the light source 214a may be configured to emit light isotropically, or substantially isotropically, within an angle range. The angle range may correspond to the particular implementation of the light source 214a, how the light source 214a is configured and/or mounted, etc. In some examples, the angle range may correspond to an angle α measured from a normal 217 to an upper surface 215 of the light source 214a, or an angle α measured from a normal 217 to another surface, such as the bottom surface 217 of the transparent cover portion 212.

According to this implementation, some of the light 205 passes through the transparent cover portion 212 and strikes the ridges 207. The light 205 that strikes the ridges 207 is scattered by and/or reflected from the ridges 207. Some of the scattered and/or reflected light (which may be referred to herein as "scattered light 219") is received by the camera 202. In this example, the control system is configured to receive, from the camera 202, image data corresponding to light scattered by and/or reflected from the ridges 207.

In this example, the control system is configured to perform a fingerprint authentication process based, at least in part, on the image data. In some implementations, the control system may be configured to extract fingerprint features from the fingerprint image. The fingerprint features may, for example, include fingerprint minutiae, keypoints and/or sweat pores. The authentication process may involve comparing currently-obtained fingerprint features with fingerprint features obtained during an enrollment process.

Figure 3:
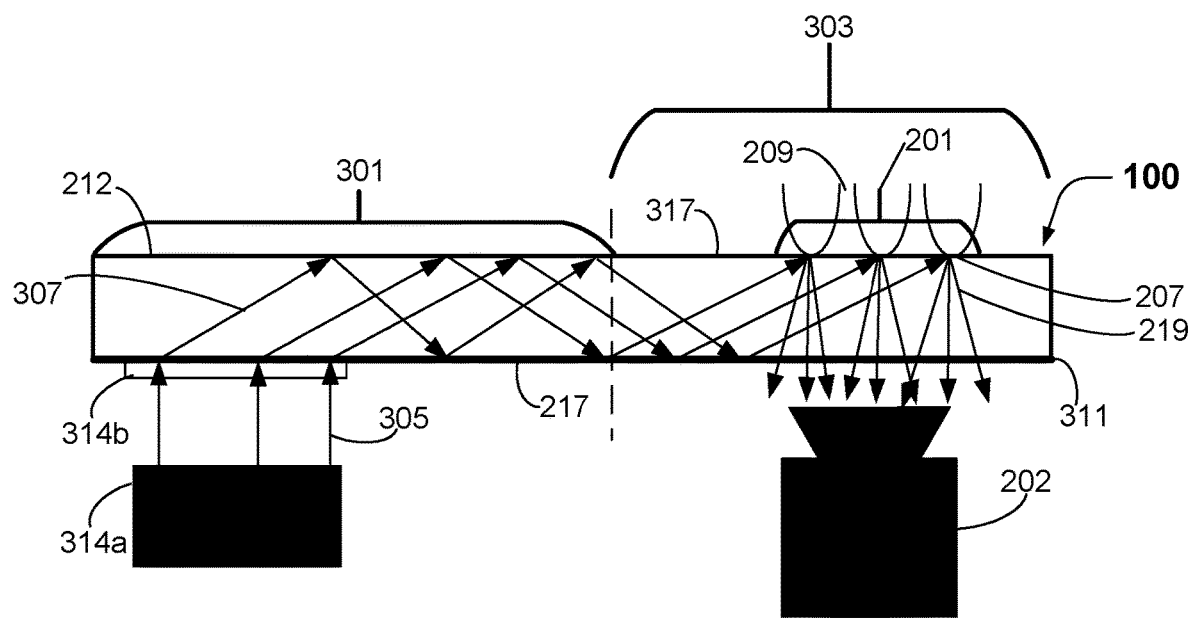
FIG. 3 shows a cross-section though another example of the apparatus of FIG. 1.

FIG. 3 shows a cross-section though another example of the apparatus of FIG. 1. As with other disclosed implementations, the types, numbers and arrangements of elements that are shown in FIG. 3, as well as the dimensions of elements, are merely examples. In this example, the apparatus 100 includes a transparent cover portion 212 of the cover 112, a camera 202 of the camera system 102 proximate a camera area 201 of the transparent cover portion 212 and a light source 314a of the light source system 114. In this example, the light source system 114 is configured to provide collimated light 305. For example, in some instances the light source 314a may be, or may include, a vertical-cavity surface-emitting laser (VCSEL) or an LED with a collimating lens.

Although not shown in FIG. 3, according to this example the apparatus 100 includes a touch sensor system and a control system, which are instances of the touch sensor system 103 and the control system 106 that are described above with reference to FIG. 1. In this example, the control system has received touch sensor signals from the touch sensor system indicating a camera area touch. The camera area touch corresponds to a target object touching the transparent cover portion 212 in the camera area 201. In this instance, the target object is a finger, some ridges 207 and valleys 209 of which are shown in FIG. 3. In this example, the control system is configured to cause, responsive to the camera area touch, the light source system 114 to provide light to the target object.

According to this example, the light source 314a is not close enough to the target object to illuminate the target object directly. In the example shown in FIG. 3, the light source 314a resides in area 301 of the apparatus 100 and the camera 202 resides in area 303 of the apparatus 100. In some implementations, the area 301 may be a display area of the display system 110. According to some such examples, the light source 314a resides under the display area. In some such examples, the light source 314a may provide the light 305 through display stack apertures between display pixels of the display system 110. The display stack apertures may be located between some or all of the display pixels. In some examples, the display stack apertures may be configured for collimating light that is transmitted through the display stack apertures. In some such examples, the display stack apertures may be surrounded by light-absorbing sidewalls. In other examples, the display stack apertures may not include light-absorbing material in the sidewalls. According to some such examples, the sidewalls may be sufficiently rough to cause scattering of light impinging on the sidewalls. Such scattering tends to prevent light impinging on the sidewalls from propagating through the display stack apertures.

In other examples, the light source 314a may reside in a "dead" area of the display in place of one or more display pixels. According to some alternative examples, one of which is illustrated in FIG. 5B and described below, the light source 314a may be a light source of the display system 110.

In this example, because the light source 314a is not close enough to the target object to illuminate the target object directly, the light source system 114 is configured to couple the light 205 emitted by the light source 314a (and, in some instances, one or more other light sources) into the transparent cover portion 212. In this example, the light source system 114 includes a light-turning film 314b that is configured to couple at least some of the light 305 into the transparent cover portion 212. In this example, the light-turning film 314b resides between the transparent cover portion 212 and the light source 314a. The light-turning film 314b may, in some examples, include a holographic volume grating, a surface relief grating and/or reflective facets.

Some of the light rays 307 are partially or totally reflected from one or more surfaces of the transparent cover portion 212. As the angle of incidence of the light 307 approaches a certain limit, called the critical angle, the angle of refraction approaches 90°, at which a refracted ray becomes parallel to the surface of the transparent cover portion 212. For angles of incidence beyond the critical angle, there is no refracted ray and the partial reflection becomes total. Accordingly, in this example at least some of the light 307 that is coupled into the transparent cover portion 212 by the light-turning film 314b propagates within the transparent cover portion 212 via total internal reflection.

In some examples, the transparent cover portion 212 may be made of a type of glass, acrylic or polycarbonate. For visible light, the critical angle is about 42° for incident light rays at the glass-to-air boundary of the surface 317 of the transparent cover portion 212. In some implementations, the indices of refraction of the transparent cover portion 212 and of a layer 311 below the surface 217 of the transparent cover portion 212 may be selected to enhance total internal reflection. For example, in some implementations the transparent cover portion 212 may be polycarbonate, which has an index of refraction of approximately 1.6, and the layer 311 may be an adhesive having a relatively low index of refraction for adhesive material, e.g., approximately 1.4, approximately 1.38, etc.

According to this implementation, some of the light 307 propagates through the transparent cover portion 212 and strikes the ridges 207, which have a different index of refraction than that of the surrounding air. The light 307 that strikes the ridges 207 is scattered by and/or reflected from the ridges 207. Some of the scattered light 219 is received by the camera 202. In this example, the control system is configured to receive, from the camera 202, image data corresponding to light scattered by and/or reflected from the ridges 207.

In this example, the control system is configured to perform a fingerprint authentication process based, at least in part, on the image data (e.g., as described above with reference to FIG. 2).

Figure 4:
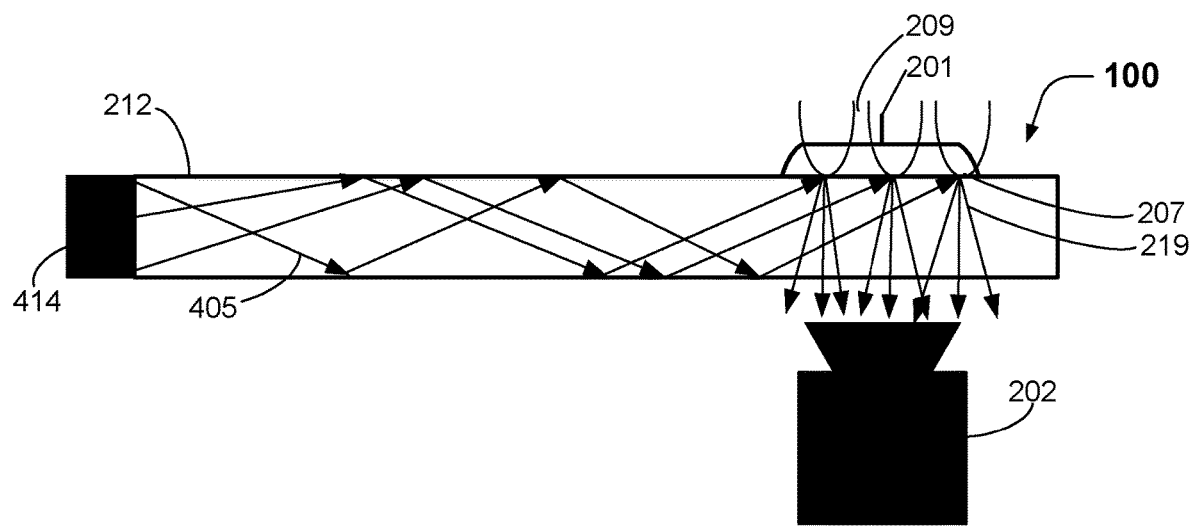
FIG. 4 shows a cross-section though another example of the apparatus of FIG. 1.

FIG. 4 shows a cross-section though another example of the apparatus of FIG. 1. As with other disclosed implementations, the types, numbers and arrangements of elements that are shown in FIG. 4, as well as the dimensions of elements, are merely examples. In this example, the apparatus 100 includes a transparent cover portion 212 of the cover 112, a camera 202 of the camera system 102 proximate a camera area 201 of the transparent cover portion 212 and a light source 414 of the light source system 114. In some examples, the light source 414 may include one or more LEDs. In this example, light source 414 is configured to edge-couple light 405 into the transparent cover portion 212.

Although not shown in FIG. 4, according to this example the apparatus 100 includes a touch sensor system and a control system, which are instances of the touch sensor system 103 and the control system 106 that are described above with reference to FIG. 1. In some examples, the touch sensor system 103 and the control system 106 may be configured to function as described above with reference to FIGS. 2 and 3.

According to this example, at least some of the light 405 that is coupled into the transparent cover portion 212 propagates within the transparent cover portion 212 via total internal reflection. According to this implementation, some of the light 405 strikes the ridges 207, which have a different index of refraction than that of the surrounding air. The light 405 that strikes the ridges 207 is scattered by and/or reflected from the ridges 207. Some of the scattered light 219 is received by the camera 202. In this example, the control system is configured to receive, from the camera 202, image data corresponding to light scattered by and/or reflected from the ridges 207. In this example, the control system is configured to perform a fingerprint authentication process based, at least in part, on the image data (e.g., as described above with reference to FIG. 2).

Figure 5A:
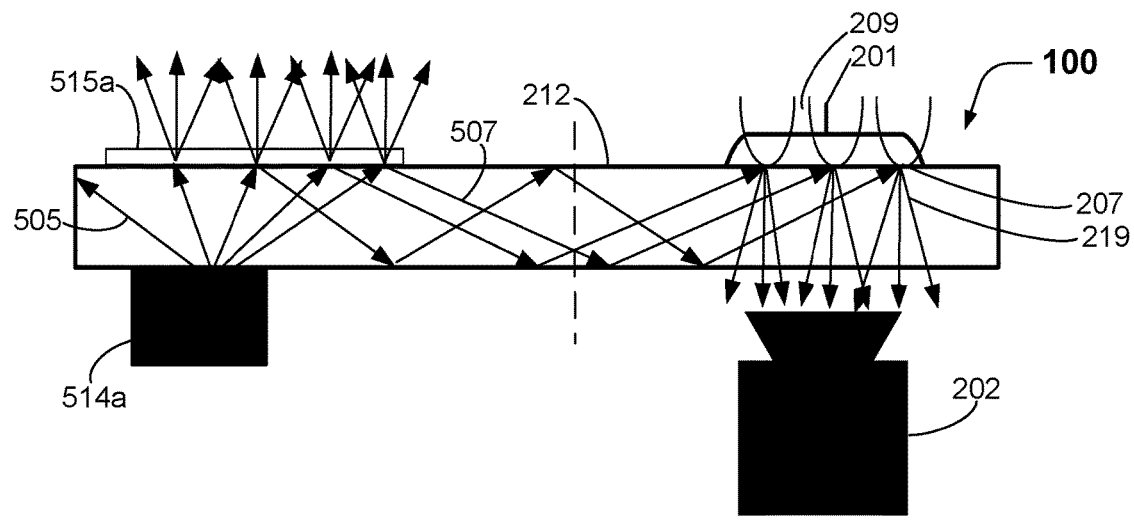
FIG. 5A shows a cross-section though another example of the apparatus of FIG. 1.
Figure 5B:
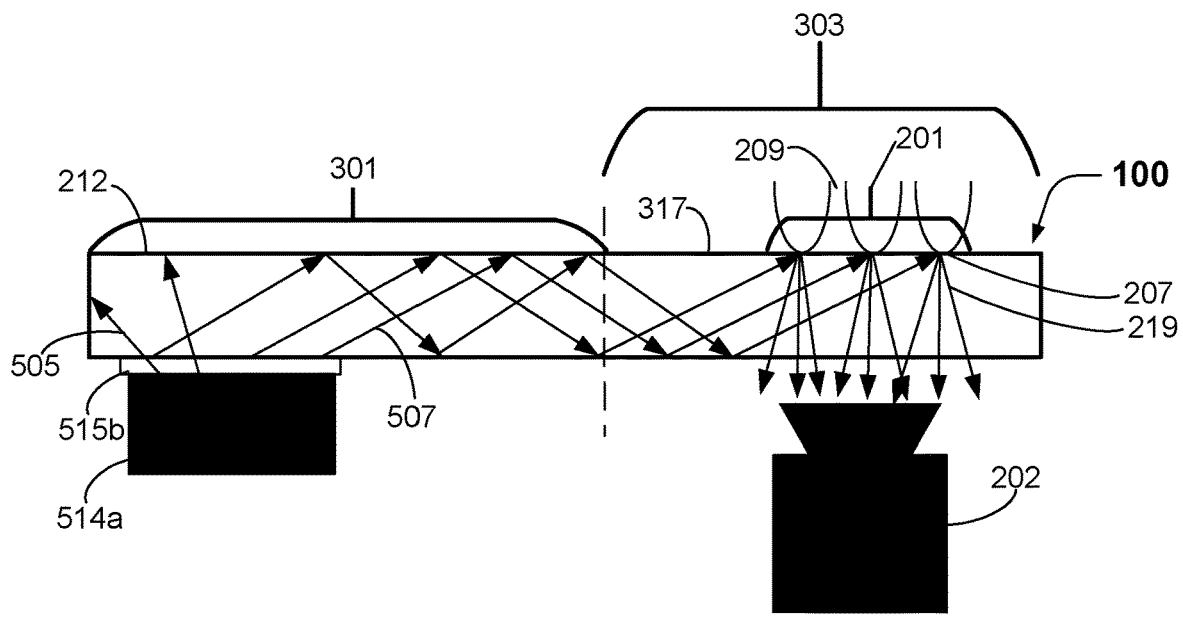
FIG. 5B shows a cross-section though another example of the apparatus of FIG. 1.

FIG. 5A shows a cross-section though another example of the apparatus of FIG. 1. As with other disclosed implementations, the types, numbers and arrangements of elements that are shown in FIG. 5A, as well as the dimensions of elements, are merely examples. In this example, the apparatus 100 includes a transparent cover portion 212 of the cover 112, a camera 202 of the camera system 102 proximate a camera area 201 of the transparent cover portion 212 and a light source 514a of the light source system 114. In some examples, the light source 514a may include one or more LEDs. In some instances, the light source 514a may include one or more display pixels of the display system 110. In some such examples, the one or more display pixels may include one or more LED pixels, one or more organic light-emitting diode (OLED) pixels or one or more liquid crystal display (LCD) pixels.

Although not shown in FIG. 5A, according to this example the apparatus 100 includes a touch sensor system and a control system, which are instances of the touch sensor system 103 and the control system 106 that are described above with reference to FIG. 1. In some examples, the touch sensor system 103 and the control system 106 may be configured to function as described above with reference to FIGS. 2 and 3.

In this example, the light source system 114 includes a light-turning patch 515a that is configured to couple at least some of the light 505 from the light source 514a into the transparent cover portion 212. In some examples, the light-turning patch 515a may be configured to diffuse the light 505 from the light source 514a. However, in some implementations the patch 515a may be configured to couple at least some of the light 505 from the light source 514a into the transparent cover portion 212 via light-turning features that are configured to direct light in one or more particular directions. In some such examples, the light-turning patch 515a may be configured to couple at least some of the light 505 from the light source 514a into the transparent cover portion 212 via specular reflection from such light-turning features. According to some implementations, the light-turning patch 515a may include a holographic volume grating, a surface relief grating and/or reflective facets.

According to this example, at least some of the light 507 that is coupled into the transparent cover portion 212 by the light-turning patch 515a propagates within the transparent cover portion 212 via total internal reflection. According to this implementation, some of the light 507 strikes the ridges 207. The light 507 that strikes the ridges 207 is scattered by and/or reflected from the ridges 207. Some of the scattered light 219 is received by the camera 202. In this example, the control system is configured to receive, from the camera 202, image data corresponding to light scattered by and/or reflected from the ridges 207. In this example, the control system is configured to perform a fingerprint authentication process based, at least in part, on the image data (e.g., as described above with reference to FIG. 2).

FIG. 5B shows a cross-section though another example of the apparatus of FIG. 1. As with other disclosed implementations, the types, numbers and arrangements of elements that are shown in FIG. 5B, as well as the dimensions of elements, are merely examples. In this example, the apparatus 100 includes a transparent cover portion 212 of the cover 112, a camera 202 of the camera system 102 proximate a camera area 201 of the transparent cover portion 212 and a light source 514a of the light source system 114. In some examples, the light source 514a may include one or more LEDs. In some instances, the light source 514a may include one or more display pixels of the display system 110.

Although not shown in FIG. 5B, according to this example the apparatus 100 includes a touch sensor system and a control system, which are instances of the touch sensor system 103 and the control system 106 that are described above with reference to FIG. 1. In some examples, the touch sensor system 103 and the control system 106 may be configured to function as described above with reference to FIGS. 2 and 3.

In this example, the light source system 114 includes a light-turning film 515b that is configured to couple at least some of the light 505 from the light source 514a into the transparent cover portion 212. According to some implementations, the light-turning film 515b may include a holographic volume grating, a surface relief grating and/or reflective facets.

According to this example, at least some of the light 507 that is coupled into the transparent cover portion 212 by the light-turning film 515b propagates within the transparent cover portion 212 via total internal reflection. According to this implementation, some of the light 507 strikes the ridges 207. The light 507 that strikes the ridges 207 is scattered by and/or reflected from the ridges 207. Some of the scattered light 219 is received by the camera 202. In this example, the control system is configured to receive, from the camera 202, image data corresponding to light scattered by and/or reflected from the ridges 207. In this example, the control system is configured to perform a fingerprint authentication process based, at least in part, on the image data (e.g., as described above with reference to FIG. 2).

Figure 5C:
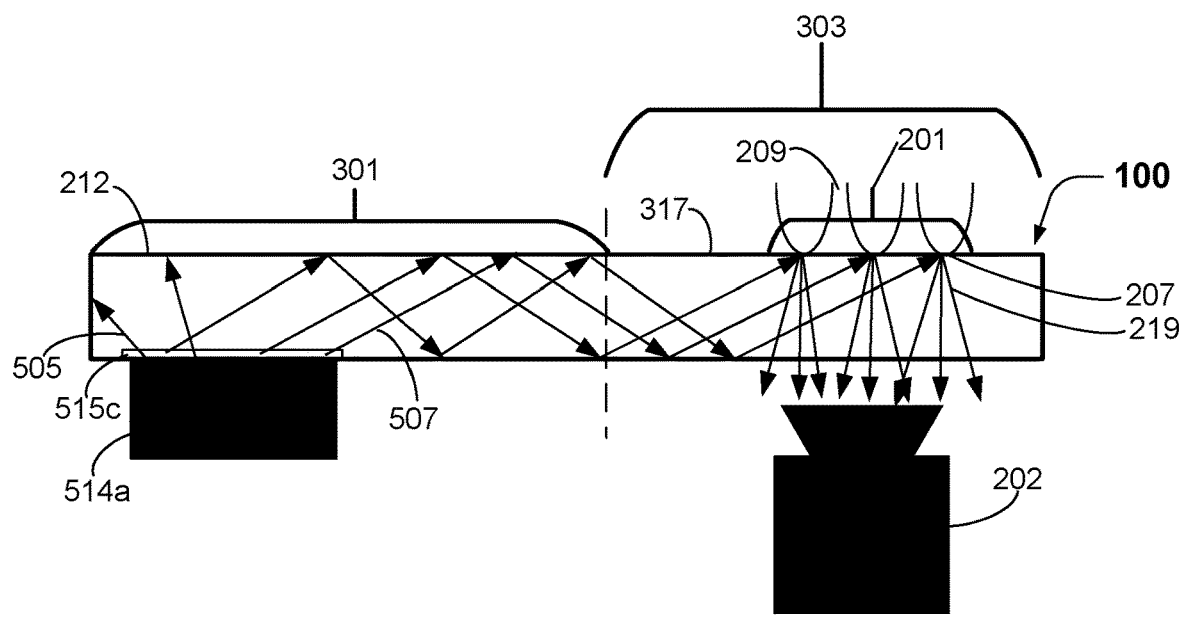
FIG. 5C shows a cross-section though another example of the apparatus of FIG. 1.

FIG. 5C shows a cross-section though another example of the apparatus of FIG. 1. As with other disclosed implementations, the types, numbers and arrangements of elements that are shown in FIG. 5C, as well as the dimensions of elements, are merely examples. In this example, the apparatus 100 includes a transparent cover portion 212 of the cover 112, a camera 202 of the camera system 102 proximate a camera area 201 of the transparent cover portion 212 and a light source 514a of the light source system 114. In some examples, the light source 514a may include one or more LEDs. In some instances, the light source 514a may include one or more display pixels of the display system 110.

According to this example the apparatus 100 includes a touch sensor system and a control system (not shown in FIG. 5C), which are instances of the touch sensor system 103 and the control system 106 that are described above with reference to FIG. 1. In some examples, the touch sensor system 103 and the control system 106 may be configured to function as described above with reference to FIGS. 2 and 3.

In this example, the light source system 114 includes a light-turning film 515c that is configured to couple at least some of the light 505 from the light source 514a into the transparent cover portion 212. According to this example, the light-turning film 515c is integrated into the transparent cover portion 212. In some instances, the light-turning film 515c may be fabricated during a process of making the transparent cover portion 212. In other examples, the light-turning film 515c may be added to the transparent cover portion 212 after the transparent cover portion 212 is made. According to some implementations, the light-turning film 515c may include a holographic volume grating, a surface relief grating and/or reflective facets.

According to some examples, except for the fact that the light-turning film 515c is integrated into the transparent cover portion 212, the light-turning film 515c may be the same as, or substantially the same as, the light-turning film 515b that is shown in FIG. 5B. In some alternative examples, a light-turning patch like the light-turning patch 515a of FIG. 5A may be integrated into the transparent cover portion 212.

According to this example, at least some of the light 507 that is coupled into the transparent cover portion 212 by the light-turning film 515c propagates within the transparent cover portion 212 via total internal reflection. According to this implementation, some of the light 507 strikes the ridges 207. The light 507 that strikes the ridges 207 is scattered by and/or reflected from the ridges 207. Some of the scattered light 219 is received by the camera 202. In this example, the control system is configured to receive, from the camera 202, image data corresponding to light scattered by and/or reflected from the ridges 207. In this example, the control system is configured to perform a fingerprint authentication process based, at least in part, on the image data (e.g., as described above with reference to FIG. 2).

Figure 5D:
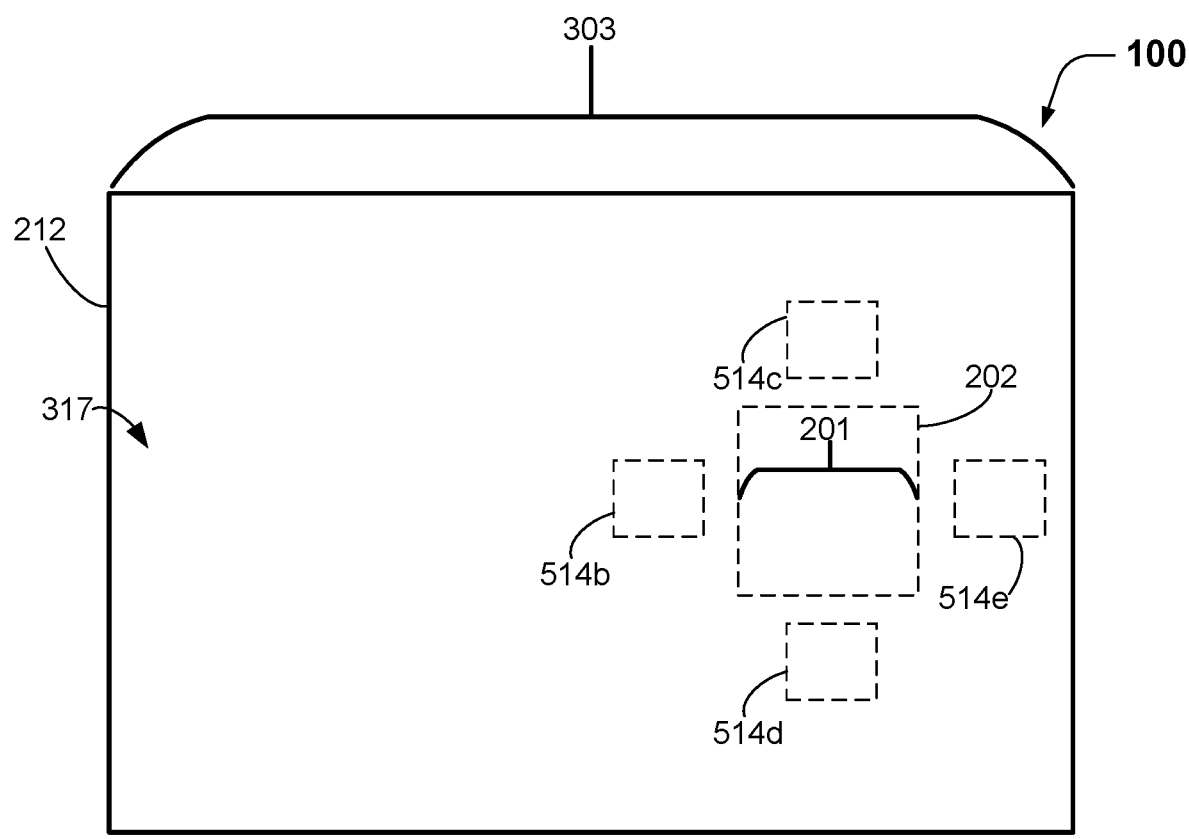
FIG. 5D shows a top view of another example of the apparatus of FIG. 1.

FIG. 5D shows a top view of another example of the apparatus of FIG. 1. As with other disclosed implementations, the types, numbers and arrangements of elements that are shown in FIG. 5D, as well as the dimensions of elements, are merely examples. In this example, the apparatus 100 includes a transparent cover portion 212 of the cover 112. FIG. 5D depicts an area 303 of the apparatus 100 that is outside of the area 301 shown in FIGS. 3 and 5B, which is a display area in some examples. In this example, the upper surface 317 of the transparent cover portion 212 is shown in FIG. 5D. The dashed rectangle in the camera area 201 represents the outline of a camera 202 below the transparent cover portion 212.

In this example, the light source system 114 includes light sources 514b, 514c, 514d and 514e, all of which are proximate the camera area 201 and below the transparent cover portion 212 in this implementation. According to some examples, the light sources 514b, 514c, 514d and 514e may include one or more LEDs. In some examples, the light sources 514b, 514c, 514d and 514e may all reside within a centimeter of the camera area 201, e.g., within a few millimeters of the camera area 201. In some examples, each of the light sources 514b, 514c, 514d and 514e may be instances of the light source 214a that is shown in FIG. 2.

Although not shown in FIG. 5D, according to this example the apparatus 100 includes a touch sensor system and a control system, which are instances of the touch sensor system 103 and the control system 106 that are described above with reference to FIG. 1. In some examples, the touch sensor system 103 and the control system 106 may be configured to function as described above with reference to FIGS. 2 and 3. In this example, the control system is configured to control, responsive to the touch of a target object in the camera area, the light sources 514b, 514c, 514d and 514e to provide light to the target object.

In some instances, the target object is a finger having ridges 207 and valleys 209, e.g., as shown in FIG. 2. According to some such examples, some of the light from the light sources 514b, 514c, 514d and 514e passes through the transparent cover portion 212 and strikes the ridges 207. The light 205 that strikes the ridges 207 is scattered by and/or reflected from the ridges 207. Some of the scattered light 219 is received by the camera 202. In this example, the control system is configured to receive, from the camera 202, image data corresponding to light scattered by and/or reflected from the ridges 207.

In some examples, all of the light sources 514b, 514c, 514d and 514e provide light with a particular modulation frequency. According to some such examples, the camera 202 or the control system may be configured to differentiate the light provided by the light sources 514b, 514c, 514d and 514e from other light, based on the particular modulation frequency. Such implementations are potentially beneficial because they can filter out noise. In this example, the control system is configured to perform a fingerprint authentication process based, at least in part, on image data received from the camera 202 (e.g., as described above with reference to FIG. 2).

Figure 6:
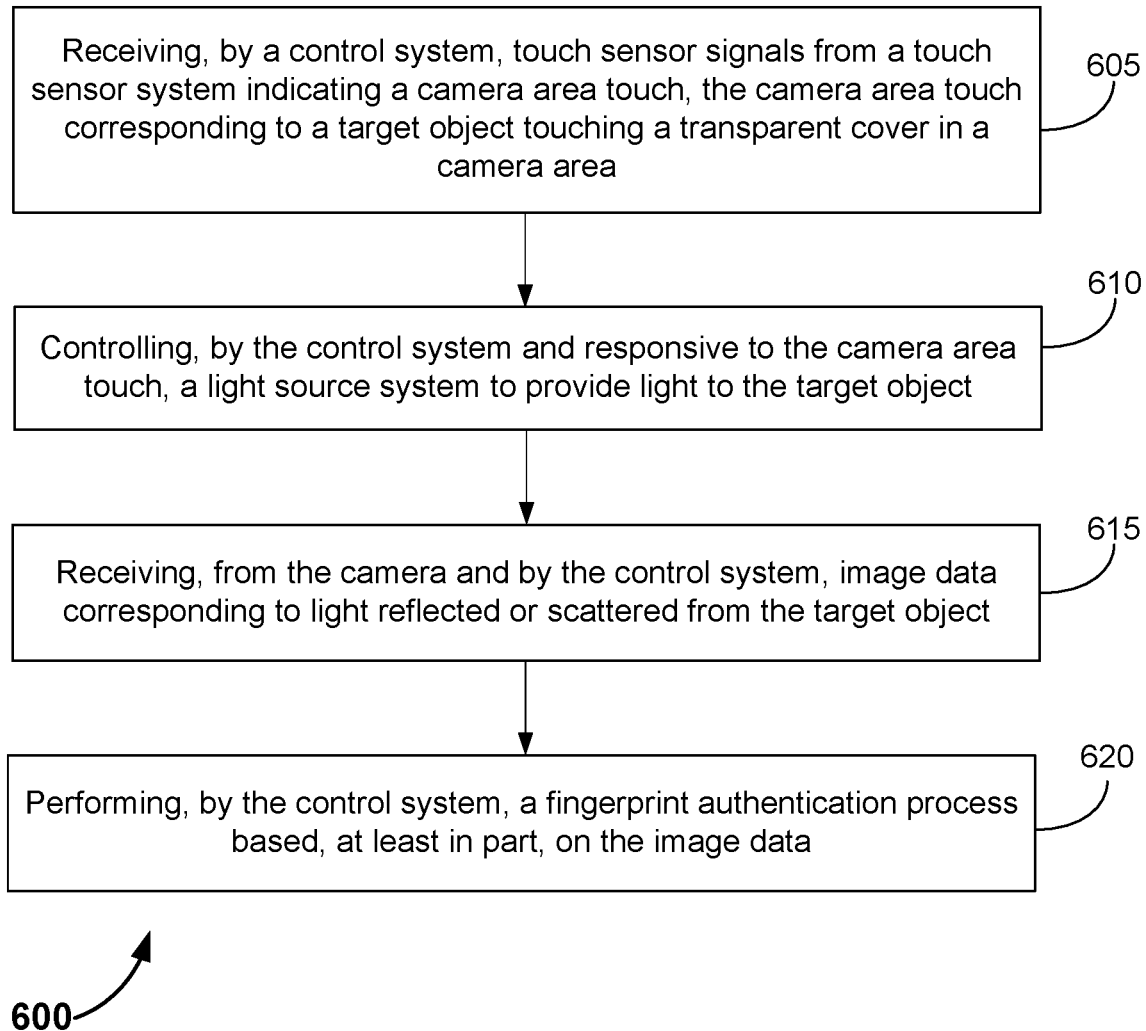
FIG. 6 is a flow diagram that provides examples of operations according to some disclosed methods.

FIG. 6 is a flow diagram that provides examples of operations according to some disclosed methods. The blocks of FIG. 6 may, for example, be performed by the apparatus 100 of FIG. 1 or by a similar apparatus. As with other methods disclosed herein, the method outlined in FIG. 6 may include more or fewer blocks than indicated. Moreover, the blocks of methods disclosed herein are not necessarily performed in the order indicated. In some implementations, one or more blocks may be performed concurrently.

In this example, block 605 involves receiving, by a control system, touch sensor signals from a touch sensor system indicating a camera area touch. The camera area touch may correspond to a target object touching a transparent cover in a camera area. For example, block 605 may involve the control system 106 of FIG. 1 receiving touch sensor signals from the touch sensor system 103 to obtain touch sensor data in a camera area. The camera area may, in some instances, be the camera area 201 that is shown in FIG. 2.

According to this example, block 610 involves controlling, by the control system and responsive to the camera area touch, a light source system to provide light to the target object. For example, referring again to FIG. 2, block 610 may involve the control system controlling at least the light source 214a to illuminate the target object in the camera area 201. In some instances, block 610 may involve coupling light into the transparent cover. In some such examples, block 610 may involve coupling light into the transparent cover via a light-turning film residing between a light source and the transparent cover. In other examples, block 610 may involve coupling light into the transparent cover via a light-turning patch that resides on the opposite side of the transparent cover from the light source. In some alternative examples, block 610 may involve coupling light into the transparent cover via edge coupling. According to some examples, method 600 may involve causing (e.g., by the control system), the camera to focus on at least a portion of the target object.

In this example, block 615 involves receiving, from the camera and by the control system, image data corresponding to light reflected or scattered from the target object. For example, referring again to FIG. 2, block 615 may involve the control system receiving the reflected or scattered light 219 from the ridges 207.

According to this example, block 620 involves performing, by the control system, a fingerprint authentication process based, at least in part, on the image data. In some such examples, block 620 may involve performing the authentication process based, at least in part, on the image data. According to some examples, method 600 may involve extracting fingerprint features from the image data. The fingerprint features may, for example, include fingerprint minutiae, keypoints and/or sweat pores. The authentication process of block 620 may involve comparing currently-obtained fingerprint features with fingerprint features obtained during an enrollment process.

Implementation examples are described in the following numbered clauses:

1. An apparatus, comprising:
   a transparent cover;
   a touch sensor system;
   a camera proximate a camera area of the transparent cover;
   a light source system; and
   a control system configured for communication with the touch sensor system, the camera and the light source system, the control system being further configured to:
      receive touch sensor signals from the touch sensor system indicating a camera area touch, the camera area touch corresponding to a target object touching the transparent cover in the camera area;
      control, responsive to the camera area touch, the light source system to provide light to the target object;
      receive, from the camera, image data corresponding to light reflected or scattered from the target object; and
      perform a fingerprint authentication process based, at least in part, on the image data.

2. The apparatus of clause 1, wherein the light source system includes at least one light source proximate the camera and configured to illuminate the target object when the target object is touching the camera area.

3. The apparatus of clause 2, wherein the at least one light source proximate the camera comprises a light-emitting diode.

4. The apparatus of any one of clauses 1-3, wherein the light source system is configured to couple light into the transparent cover.

5. The apparatus of clause 4, wherein the light source system includes a light-turning film configured to couple the light into the transparent cover.

6. The apparatus of clause 5, wherein the light-turning film resides between the transparent cover and at least one light source of the light source system.

7. The apparatus of clause 5, wherein at least one light source of the light source system resides on a first side of the transparent cover and wherein the light-turning film resides on a second and opposing side of the transparent cover.

8. The apparatus of clause 5, wherein the light-turning film includes one or more of a holographic volume grating, a surface relief grating or reflective facets.

9. The apparatus of clause 5, wherein the light source system includes one or more display pixels configured to provide light to the light-turning film.

10. The apparatus of clause 9, wherein the one or more display pixels include one or more light-emitting diode pixels, one or more organic light-emitting diode pixels or one or more liquid crystal display pixels.

11. The apparatus of clause 4, wherein the light source system is configured to couple light into the transparent cover via edge coupling.

12. The apparatus of any one of clauses 1-11, wherein the control system is configured to extract fingerprint features from the image data and wherein the fingerprint authentication process involves comparing currently-obtained fingerprint features with fingerprint features obtained during an enrollment process.

13. The apparatus of clause 12, wherein the fingerprint features include one or more of fingerprint minutiae, keypoints or sweat pores.

14. The apparatus of any one of clauses 1-13, wherein the control system is configured to cause the camera to focus on at least a portion of the target object.

15. A method, comprising:
   receiving, by a control system, touch sensor signals from a touch sensor system indicating a camera area touch, the camera area touch corresponding to a target object touching a transparent cover in a camera area;
   controlling, by the control system and responsive to the camera area touch, a light source system to provide light to the target object;
   receiving, from the camera and by the control system, image data corresponding to light reflected or scattered from the target object; and
   performing, by the control system, a fingerprint authentication process based, at least in part, on the image data.

16. The method of clause 15, further comprising coupling light into the transparent cover via edge coupling.

17. The method of clause 15 or clause 16, further comprising extracting, by the control system, fingerprint features from the image data, wherein the fingerprint authentication process involves comparing currently-obtained fingerprint features with fingerprint features obtained during an enrollment process.

18. The method of clause 17, wherein the fingerprint features include one or more of fingerprint minutiae, keypoints or sweat pores.

19. The method of any one of clauses 15-18, further comprising causing, by the control system, the camera to focus on at least a portion of the target object.

20. One or more non-transitory media having software stored thereon, the software including a set of instructions for controlling one or more devices to perform a method, the method comprising:
   receiving, by a control system, touch sensor signals from a touch sensor system indicating a camera area touch, the camera area touch corresponding to a target object touching a transparent cover in a camera area;
   controlling, by the control system and responsive to the camera area touch, a light source system to provide light to the target object;
   receiving, from the camera and by the control system, image data corresponding to light reflected or scattered from the target object; and
   performing, by the control system, a fingerprint authentication process based, at least in part, on the image data.

21. The one or more non-transitory media of clause 20, wherein the method further comprises coupling light into the transparent cover via edge coupling.

22. The one or more non-transitory media of clause 20 or clause 21, wherein the method further comprises extracting, by the control system, fingerprint features from the image data, wherein the fingerprint authentication process involves comparing currently-obtained fingerprint features with fingerprint features obtained during an enrollment process.

23. The one or more non-transitory media of any one of clauses 20-22, wherein the fingerprint features include one or more of fingerprint minutiae, keypoints or sweat pores.

24. The one or more non-transitory media of any one of clauses 20-23, wherein the method further comprises causing, by the control system, the camera to focus on at least a portion of the target object.

25. An apparatus, comprising:
a transparent cover;
a touch sensor system;
a camera proximate a camera area of the transparent cover;
a light source system; and
control means for:
receiving touch sensor signals from the touch sensor system indicating a camera area touch, the camera area touch corresponding to a target object touching the transparent cover in the camera area;
controlling, responsive to the camera area touch, the light source system to provide light to the target object;
receiving, from the camera, image data corresponding to light reflected or scattered from the target object; and
performing a fingerprint authentication process based, at least in part, on the image data.

26. The apparatus of clause 25, wherein the light source system includes at least one light source proximate the camera and configured to illuminate the target object when the target object is touching the camera area.

27. The apparatus of clause 26, wherein the at least one light source proximate the camera comprises a light-emitting diode.

28. The apparatus of any one of clauses 25-27, wherein the light source system is configured to couple light into the transparent cover.

29. The apparatus of clause 28, wherein the light source system includes a light-turning film configured to couple the light into the transparent cover.

30. The apparatus of clause 29, wherein the light-turning film resides between the transparent cover and at least one light source of the light source system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
   a transparent cover;
   a touch sensor system;
   a camera proximate a camera area of the transparent cover;
   a light source system; and
   a control system configured for communication with the touch sensor system, the camera and the light source system, the control system being further configured to:
      receive touch sensor signals from the touch sensor system indicating a camera area touch, the camera area touch corresponding to a target object touching the transparent cover in the camera area;
      control, responsive to the camera area touch, the light source system to provide light to the target object;
      receive, from the camera, image data corresponding to reflected light or scattered light from the target object; and
      perform a fingerprint authentication process based, at least in part, on the image data;
   wherein the light source system includes a light-turning film configured to couple light into the transparent cover.

2. The apparatus of claim 1, wherein the light source system includes at least one light source proximate the camera and configured to illuminate the target object when the target object is touching the camera area.

3. The apparatus of claim 2, wherein the at least one light source proximate the camera comprises a light-emitting diode.

4. The apparatus of claim 1, wherein the light-turning film resides between the transparent cover and at least one light source of the light source system.

5. The apparatus of claim 1, wherein at least one light source of the light source system resides on a first side of the transparent cover and wherein the light-turning film resides on a second and opposing side of the transparent cover.

6. The apparatus of claim 1, wherein the light-turning film includes one or more of a holographic volume grating, a surface relief grating or reflective facets.

7. The apparatus of claim 1, wherein the light source system includes one or more display pixels configured to provide light to the light-turning film.

8. The apparatus of claim 7, wherein the one or more display pixels include one or more light-emitting diode pixels, one or more organic light-emitting diode pixels or one or more liquid crystal display pixels.

9. The apparatus of claim 1, wherein the light source system is configured to couple light into the transparent cover via edge coupling.

10. The apparatus of claim 1, wherein the control system is configured to extract fingerprint features from the image data and wherein the fingerprint authentication process involves comparing currently-obtained fingerprint features with fingerprint features obtained during an enrollment process.

11. The apparatus of claim 10, wherein the fingerprint features include one or more of fingerprint minutiae, keypoints or sweat pores.

12. The apparatus of claim 1, wherein the control system is configured to cause the camera to focus on at least a portion of the target object.

13. A method, comprising:
   receiving, by a control system, touch sensor signals from a touch sensor system indicating a camera area touch, the camera area touch corresponding to a target object touching a transparent cover in a camera area;
   controlling, by the control system and responsive to the camera area touch, a light source system to provide light to the target object;
   receiving, from the camera and by the control system, image data corresponding to reflected light or scattered light from the target object; and
   performing, by the control system, a fingerprint authentication process based, at least in part, on the image data;
   wherein the light source system includes a light-turning film configured to couple light into the transparent cover.

14. The method of claim 13, further comprising coupling light into the transparent cover via edge coupling.

15. The method of claim 13, further comprising extracting, by the control system, fingerprint features from the image data, wherein the fingerprint authentication process involves comparing currently-obtained fingerprint features with fingerprint features obtained during an enrollment process.

16. The method of claim 15, wherein the fingerprint features include one or more of fingerprint minutiae, keypoints or sweat pores.

17. The method of claim 13, further comprising causing, by the control system, the camera to focus on at least a portion of the target object.

18. One or more non-transitory media having software stored thereon, the software including a set of instructions for controlling one or more devices to perform a method, the method comprising:
   receiving, by a control system, touch sensor signals from a touch sensor system indicating a camera area touch, the camera area touch corresponding to a target object touching a transparent cover in a camera area;

controlling, by the control system and responsive to the camera area touch, a light source system to provide light to the target object;

receiving, from the camera and by the control system, image data corresponding to light reflected or scattered from the target object; and performing, by the control system, a fingerprint authentication process based, at least in part, on the image data;

wherein the light source system includes a light-turning film configured to couple light into the transparent cover.

19. The one or more non-transitory media of claim 18, wherein the method further comprises coupling light into the transparent cover via edge coupling.

20. The one or more non-transitory media of claim 18, wherein the method further comprises extracting, by the control system, fingerprint features from the image data, wherein the fingerprint authentication process involves comparing currently-obtained fingerprint features with fingerprint features obtained during an enrollment process.

21. The one or more non-transitory media of claim 18, wherein the fingerprint features include one or more of fingerprint minutiae, keypoints or sweat pores.

22. The one or more non-transitory media of claim 18, wherein the method further comprises causing, by the control system, the camera to focus on at least a portion of the target object.

23. An apparatus, comprising:
a transparent cover;
a touch sensor system;
a camera proximate a camera area of the transparent cover;
a light source system; and
control means for:
receiving touch sensor signals from the touch sensor system indicating a camera area touch, the camera area touch corresponding to a target object touching the transparent cover in the camera area;
controlling, responsive to the camera area touch, the light source system to provide light to the target object;
receiving, from the camera, image data corresponding to reflected light or scattered light from the target object; and
performing a fingerprint authentication process based, at least in part, on the image data,
wherein the light source system includes a light-turning film configured to couple light into the transparent cover.

24. The apparatus of claim 23, wherein the light source system includes at least one light source proximate the camera and configured to illuminate the target object when the target object is touching the camera area.

25. The apparatus of claim 24, wherein the at least one light source proximate the camera comprises a light-emitting diode.

26. The apparatus of claim 23, wherein the light-turning film resides between the transparent cover and at least one light source of the light source system.

* * * * *